United States Patent
Hirai et al.

(10) Patent No.: US 10,654,721 B2
(45) Date of Patent: May 19, 2020

(54) GRAPHENE DISPERSION, PROCESS FOR PRODUCING SAME, PROCESS FOR PRODUCING PARTICLES OF GRAPHENE/ACTIVE MATERIAL COMPOSITE, AND PROCESS FOR PRODUCING ELECTRODE PASTE

(71) Applicant: TORAY INDUSTRIES, INC., Tokyo (JP)

(72) Inventors: Yoshihide Hirai, Otsu (JP); Eiichiro Tamaki, Otsu (JP); Manabu Kawasaki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 224 days.

(21) Appl. No.: 15/760,562

(22) PCT Filed: Sep. 9, 2016

(86) PCT No.: PCT/JP2016/076656
§ 371 (c)(1),
(2) Date: Mar. 15, 2018

(87) PCT Pub. No.: WO2017/047523
PCT Pub. Date: Mar. 23, 2017

(65) Prior Publication Data
US 2018/0269465 A1 Sep. 20, 2018

(30) Foreign Application Priority Data
Sep. 18, 2015 (JP) .................. 2015-184815

(51) Int. Cl.
| | | |
|---|---|---|
| *C01B 32/182* | (2017.01) | |
| *H01M 4/62* | (2006.01) | |
| *C01B 32/184* | (2017.01) | |
| *C01B 32/194* | (2017.01) | |
| *H01M 4/131* | (2010.01) | |
| *H01M 4/1391* | (2010.01) | |
| *C01B 32/198* | (2017.01) | |
| *C01B 32/186* | (2017.01) | |
| *H01M 4/04* | (2006.01) | |
| *H01M 4/133* | (2010.01) | |
| *H01M 4/1393* | (2010.01) | |
| *H01M 4/36* | (2006.01) | |
| *H01M 4/583* | (2010.01) | |
| *H01M 10/0525* | (2010.01) | |
| *B82Y 30/00* | (2011.01) | |
| *B82Y 40/00* | (2011.01) | |

(52) U.S. Cl.
CPC .......... *C01B 32/182* (2017.08); *C01B 32/184* (2017.08); *C01B 32/186* (2017.08); *C01B 32/194* (2017.08); *C01B 32/198* (2017.08); *H01M 4/0428* (2013.01); *H01M 4/131* (2013.01); *H01M 4/133* (2013.01); *H01M 4/1391* (2013.01); *H01M 4/1393* (2013.01); *H01M 4/364* (2013.01); *H01M 4/583* (2013.01); *H01M 4/625* (2013.01); *H01M 10/0525* (2013.01); *B82Y 30/00* (2013.01); *B82Y 40/00* (2013.01); *C01B 2204/04* (2013.01); *C01B 2204/20* (2013.01); *C01B 2204/32* (2013.01)

(58) Field of Classification Search
CPC .. H01M 4/0428; C01B 32/182; C01B 32/184; C01B 32/186; C01B 32/198
USPC ....................................................... 429/231.8
See application file for complete search history.

(56) References Cited

U.S. PATENT DOCUMENTS

| | | | |
|---|---|---|---|
| 9,045,346 B2 | 6/2015 | Nesper et al. | |
| 2014/0079932 A1* | 3/2014 | Aksay | B82Y 30/00 428/219 |
| 2014/0335011 A1* | 11/2014 | Dubois | C01B 32/184 423/448 |
| 2014/0370262 A1* | 12/2014 | Kim | B82Y 30/00 428/219 |
| 2015/0140438 A1 | 5/2015 | Sun et al. | |

FOREIGN PATENT DOCUMENTS

| | | |
|---|---|---|
| EP | 3367479 A1 | 8/2018 |
| EP | 3425653 A1 | 1/2019 |
| JP | 2011219318 A | 11/2011 |
| JP | 2014009151 A | 1/2014 |
| JP | 2015059079 A | 3/2015 |
| JP | 2015520109 A | 7/2015 |

(Continued)

OTHER PUBLICATIONS

Extended European Search Report for European Application No. 16 846 394.1, dated Jun. 17, 2019—9 pages.

(Continued)

*Primary Examiner* — James M Erwin

(74) *Attorney, Agent, or Firm* — RatnerPrestia

(57) ABSTRACT

A graphene material has a specific form that has a high dispersibility and can maintain a high electric conductivity and ion conductivity when used as material for electrode manufacturing. A graphene dispersion liquid is provided including graphene dispersed in an organic solvent and meeting both $0.5\ \mu m \leq S \leq 15\ \mu m$ and $1.0 \leq D/S \leq 3.0$ wherein D is the median diameter (μm) of the graphene measured by the laser diffraction/scattering type particle size distribution measurement method and S is the average size (μm) in the planar direction of the graphene calculated from the arithmetic mean of the longest diameter and shortest diameter of the graphene observed by a laser microscope.

13 Claims, No Drawings

(56) References Cited

FOREIGN PATENT DOCUMENTS

| WO | 2007047084 A2 | 4/2007 |
| WO | 2013181994 A1 | 12/2013 |
| WO | 2014140324 A1 | 9/2014 |
| WO | 2015122498 A1 | 8/2015 |

OTHER PUBLICATIONS

International Search Report and Written Opinion for International Application No. PCT/JP2016/076656, dated Oct. 18, 2016, 5 pages.

\* cited by examiner

GRAPHENE DISPERSION, PROCESS FOR PRODUCING SAME, PROCESS FOR PRODUCING PARTICLES OF GRAPHENE/ACTIVE MATERIAL COMPOSITE, AND PROCESS FOR PRODUCING ELECTRODE PASTE

CROSS REFERENCE TO RELATED APPLICATIONS

This is the U.S. National Phase application of PCT/JP2016/076656, filed Sep. 9, 2016, which claims priority to Japanese Patent Application No. 2015-184815, filed Sep. 18, 2015, the disclosures of these applications being incorporated herein by reference in their entireties for all purposes.

TECHNICAL FIELD OF THE INVENTION

The present invention relates to a graphene dispersion liquid, a method for production thereof, a method for producing graphene/active material composite particles therefrom and a method for producing electrode paste.

BACKGROUND OF THE INVENTION

Graphene is in the form of a two-dimensional crystal of carbon atoms and great attention has been focused on graphene as industrial material since its discovery in 2004. Graphene has excellent electric, thermal, optical, and mechanical characteristics, and there are growing expectations for its applications in wide areas such as production of battery materials, energy storage materials, electronic devices, and composite materials.

Methods available for the production of graphene include the mechanical exfoliation method, CVD (chemical vapor deposition) method, and CEG (crystal epitaxial growth) method. Among others, the oxidization-and-reduction method, in which graphite oxide or graphene oxide is produced first through oxidization of natural graphite, followed by converting it into graphene through reduction reaction, is now expected as a promising industrial method for large-scale production.

In Patent document 1, graphene oxide is expanded and exfoliated while it is heated for reduction in order to produce thin layers of graphite with a large specific surface area.

In Patent document 2, graphene is chemically reduced and subsequently freeze-dried to prepare a graphene powder with high dispersibility.

In Patent document 3, graphene powder is produced by applying ultrasonic waves to a liquid mixture containing graphite particles to prepare a graphene dispersion liquid and removing the dispersion medium by drying.

PATENT DOCUMENTS

[Patent Document 1]: International Publication WO 2007/047084
[Patent Document 2]: International Publication WO 2013/181994
[Patent document 3] Japanese Unexamined Patent Publication (Kokai) No. 2011-219318

SUMMARY OF THE INVENTION

To work effectively as conductive agent, the graphene material to be used should be in the form of thin, highly dispersible flakes. However, the graphene material prepared by the heating-expansion-reduction process as proposed in Patent document 1 tends to be so large in specific surface area as to induce agglomeration and a decrease in dispersibility.

When performing the method proposed in Patent document 2, the subsequent freeze-drying tends to cause excessive stacking (layered agglomeration) of graphene layers, leading to insufficient exfoliation of the graphene powder.

In the method proposed in Patent document 3, furthermore, graphene powder is obtained by drying to remove the dispersion medium from a liquid mixture containing granulated graphite powder and accordingly, it is impossible to prevent excessive agglomeration of graphene powder from being caused by the drying.

Thus, graphene has a strong tendency to agglomerate and therefore fails to develop an adequate dispersibility, making it impossible to achieve its full potential. An object of the present invention is to provide a graphene material in a specific form that has a high dispersibility and can maintain a high electric conductivity and ion conductivity when used as material for electrode manufacturing.

To solve the above problem, one aspect of the present invention provides a graphene dispersion liquid including graphene dispersed in an organic solvent and having the following feature: the median diameter D (μm) of the graphene measured by the laser diffraction/scattering type particle size distribution measurement method and the average size S (μm) in the planar direction of the graphene calculated from the arithmetic mean of the longest diameter and shortest diameter of the graphene observed by a laser microscope meet both Equations (1) and (2) given below:

$$0.5\ \mu m \leq S \leq 15\ \mu m \tag{1}$$

$$1.0 \leq D/S \leq 3.0 \tag{2}$$

The production method for the graphene dispersion liquid according to another aspect of the present invention include:

a reduction step for reducing graphene oxide dispersed in a water-containing dispersion medium;

a fine fragmentation step for finely fragmenting the graphene oxide or graphene contained in the intermediate dispersion liquid before or after the reduction step or in the middle of the reduction step;

an organic solvent mixing step for mixing the intermediate dispersion liquid resulting from the reduction step and the fine fragmentation step with an organic solvent;

a strong stirring step for stirring the intermediate dispersion liquid containing an organic solvent at a shear rate of 5,000 per second to 50,000 per second; and a water removal step for removing at least part of the water from the intermediate dispersion liquid by a combination of the addition of a organic solvent and suction filtration or by distillation.

The present invention can provide a graphene dispersion liquid in which sufficiently thin graphene flakes are sufficiently dispersed in an organic solvent so that it can function as a conductive additive and in which excessive agglomeration is depressed. When using such a graphene dispersion liquid, the graphene can disperse favorably in resin, electrode paste, etc. The graphene can also be adsorbed easily to the surface of active material and therefore, a high electronic conductivity and ion conductivity can be maintained for a long period of time in an electrode produced therefrom.

DETAILED DESCRIPTION OF EMBODIMENTS OF THE INVENTION

<Graphene Dispersion Liquid>

On embodiment of the present invention provides a graphene dispersion liquid including graphene dispersed in an organic solvent and having the following feature: the median diameter D (μm) of the graphene measured by the laser diffraction/scattering type particle size distribution measurement method and the average size S (μm) in the planar direction of the graphene calculated from the arithmetic mean of the longest diameter and shortest diameter of the graphene observed by a laser microscope meet both Equations (1) and (2) given below:

$$0.5 \ \mu m \leq S \leq 15 \ \mu m \quad (1)$$

$$1.0 \leq D/S \leq 3.0. \quad (2)$$

The median diameter D (μm) of a graphene dispersion liquid is a particle diameter corresponding to the median of its particle size distribution determined by subjecting the graphene dispersion liquid directly to laser diffraction/scattering type particle size distribution measurement.

The value to be used as the average size S (μm) in the planar direction of the graphene is determined from the arithmetic mean of the longest diameter and shortest diameter of the graphene observed by a laser microscope.

First, the graphene dispersion liquid is diluted with N-methylpyrolidone (NMP) to 0.002 mass %, dropped on a glass substrate, and dried. Then, the graphene specimen on the glass substrate is observed by laser microscopy to measure the longest diameter and the shortest diameter of each graphene flake, and their arithmetic mean is used to calculate the size in the planar direction of the graphene flake. A total of 50 graphene flakes are selected randomly, and their sizes in the planar direction are calculated and averaged to give the average S.

If graphene flakes in an electrode have an S less than 0.5 μm, the number of contacts between them will be so large that the electric resistance will increase. If S is more than 15 μm, on the other hand, the graphene will be low in the degree of exfoliation and dispersibility in the solvent and it is feared that when used as paste for electrodes, it may suffer from poor coating properties and low coat film quality, possibly leading to electrodes in which good conductive paths are not formed. S is preferably 1.0 μm or more and 10 μm or less, and more preferably 1.5 μm or more and 4.0 μm or less.

Furthermore, if D/S is less than 1, that is, in the case where the size S in the planar direction of graphene is larger than the median diameter D, it means that the graphene flakes have folded structures in the solvent rather than planar shapes. In this case, each graphene flake will be isolated, possibly failing to form good conductive paths when used to produce an electrode. If the D/S ratio is more than 3, on the other hand, it means that the graphene flakes are excessively agglomerated, making it impossible to achieve required degrees of exfoliation and dispersibility. The D/S ratio is preferably 1.4 or more and 2.5 or less.

For the graphene dispersion liquid according to the present invention, furthermore, the average thickness T (μm) of graphene flakes observed by a laser microscope preferably meets Equation (3) given below.

$$100 \leq S/T \leq 1500. \quad (3)$$

The average thickness T (nm) of graphene flakes should be determined as described below. The graphene dispersion liquid is diluted with NMP to 0.002 mass %, dropped on a glass substrate, and dried. Then, the graphene on the substrate is observed by a laser microscope, which serves for observation of three dimensional shapes, and the thickness of each graphene flake is measured. For a flake having a thickness distribution, the average over the surface area is determined. A total of 50 graphene flakes are selected randomly, and their thicknesses are calculated and averaged to give the average thickness T.

If the S/T ratio is less than 100, it means that the thickness in the layer stacking direction of the graphene flakes is large relative to the size in the planar direction of the graphene flakes. In this case, the electrodes produced will have poor electric conductivity. If the S/T ratio is larger than 1500, on the other hand, it means that the thickness in the layer stacking direction of the graphene flakes is small relative to the size in the planar direction of the graphene flakes. In this case, the viscosity of the dispersion liquid itself and that of electrode pastes produced therefrom are likely to increase, possibly leading to a decrease in workability during handling. For the graphene dispersion liquid according to the present invention, it is preferable for the following equation to hold: $200 \leq S/T \leq 800$.

It is preferable for the graphene dispersion liquid according to the present invention to have a solid content (G) of 0.3 mass % or more and 40 mass % or less. If the solid content is more than 40 mass %, stacking of graphene will easily occur in the dispersion liquid. If the solid content is less than 0.3 mass %, on the other hand, the solvent in the dispersion liquid during electrode paste production will remain in a large quantity to cause a decrease in the solid content in the electrode paste and a decrease in viscosity, leading to deterioration in coating properties. The solid content is more preferably 20 mass % or less, still more preferably 10 mass % or less, still more preferably 7 mass % or less, and particularly preferably 5 mass % or less. If the solid content is 5 mass % or less, the flowability tends to increase, leading to a high handleability. On the other hand, the solid content is more preferably 0.7 mass % or more, and still more preferably 1 mass % or more.

The solid content G of a graphene dispersion liquid can be determined after removing the solvent from the graphene dispersion liquid by measuring the weight of the dried material and dividing the measured value by the weight of the graphene dispersion liquid itself. Specifically, approximately 1 gram of a graphene dispersion liquid is deposited on a glass substrate with a known weight and heated for 1.5 hours on a hot plate adjusted to a temperature of 120° C. to volatilize the solvent, followed by calculation using the measured weight of the remaining graphene material. It is preferable for the graphene dispersion liquid according to the present invention to contain a surface treatment agent having an acidic group (hereinafter occasionally referred to simply as surface treatment agent). The surface treatment agent having an acidic group should be at least partly adhered to the surface of the graphene to have the effect of enhancing the dispersibility of the graphene. Here, the acidic group is a hydroxyl group, phenolic hydroxyl group, nitro group, carboxyl group, or carbonyl group. There are no specific limitations on the acidic group, and it may be either a polymer compound or a low molecular weight compound.

Examples of the polymer compound having an acidic group include polyvinyl pyrolidone, polyvinyl alcohol, and polymethyl vinyl ether. From the viewpoint of affinity with a graphene surface, it is preferable for the low molecular weight compound to be a compound having an aromatic ring. From the viewpoint of increasing the electric conductivity of graphene, the use of a low molecule compound is preferable to a polymer compound.

In particular, compounds having catechol groups are preferred as surface treatment agents because they are highly adhesive to graphene and highly dispersible in solvents.

Such compounds having the catechol group include catechol, dopamine hydrochloride, 4-(1-hydroxy-2-aminoethyl) catechol, 3,4-dihydroxy benzoic acid, 3,4-dihydroxyphenyl acetic acid, caffeic acid, 4-methyl catechol, and 4-tert-butyl pyrocatechol.

The acidic group existing in a surface treatment agent is preferably a phenolic hydroxyl group. Examples of a compound having a phenolic hydroxy group include phenol, nitro phenol, cresol, catechol, and compounds having a structure that can be formed by at least partial substitution thereof.

A surfactant having an acidic group may also be used preferably as surface treatment agent. Examples of the surfactant include cationic surfactants, anionic surfactants, and nonionic surfactants, but since anions and cations may participate themselves in electrochemical reactions, nonionic surfactants are preferred for use in battery materials because they are not ionized.

The surface treatment agent may contain a basic group in addition to an acidic group, and in particular, its dispersibility may be enhanced if having an amino group. Accordingly, a compound having both a catechol group and an amino group may be particularly preferred as surface treatment agent. Examples of such a compound include dopamine hydrochloride.

For the graphene contained in the graphene dispersion liquid according to the present invention, the element ratio of oxygen to carbon (O/C ratio) determined by X-ray photoelectron spectroscopy is preferably 0.08 or more and 0.30 or less. The oxygen atoms existing on the graphene surface are those in the acidic groups bonded to the graphene itself and those in the acidic groups contained in the surface treatment agent adhered to the graphene surface. These acidic groups serve to improve the dispersion state of the graphene, and the dispersibility deteriorates if the graphene surface lacks acidic groups. The O/C ratio of graphene is more preferably 0.10 or more. On the other hand, the electric conductivity decreases if there exist excessive numbers of acidic groups. The O/C ratio of graphene is more preferably 0.20 or less, and more preferably 0.15 or less.

The procedure of X-ray photoelectron spectroscopy includes predrying a graphene dispersion liquid by a vacuum dryer, freeze-drier, or the like, introducing the dried specimen into a measuring chamber having a high vacuum chamber, applying soft X ray to the surface of the specimen placed in an ultrahigh vacuum, and detecting the photoelectrons released from the surface using an analyzer. These photoelectrons are examined by the wide scan and narrow scan modes and the binding energy of the bound electrons in the substance is determined to provide element information on the substance surface. Specifically, it can be determined by the method described in Measurement example 5 described later.

Examination of graphene by X-ray photoelectron spectroscopy detects the C1s peak attributed to carbon appearing near 284 eV. It is known that when the carbon is bonded to oxygen, the peak shifts toward the high energy side. More specifically, the peaks attributed to C—C bond, C=C double bond, or C—H bond, in which the carbon atoms are not bonded to oxygen, do not shift and appear near 284 eV, whereas the peaks attributed to C—O single bond, C=O double bond, and COO bond shift to near 286.5 eV, near 287.5 eV, and near 288.5 eV, respectively. As a result, signals derived from carbon atoms are detected in a shape of overlapping peaks located near 284 eV, near 286.5 eV, near 287.5 eV, and near 288.5 eV. At the same time, the N1s peak attributed to nitrogen is detected near 402 eV and the O1s peak attributed to oxygen is detected near 533 eV. Then, the O/C ratio can be calculated from the peak areas of the C1s peak and the O1s peak.

The O/C ratio of graphene can be controlled by changing the oxidation degree of the graphene oxide fed as starting material and the quantity of the surface treatment agent added. For example, the number of the remaining oxygen atoms after the reduction treatment increases with an increasing oxidation degree of the graphene oxide whereas the number of the remaining oxygen atoms after the reduction treatment decreases with a decreasing oxidation degree. The number of oxygen atoms can be increased by adding an increased amount of a surface treatment agent having an acidic group.

In the graphene dispersion liquid according to an embodiment of the present invention, the organic solvent has an NMP content of 50 mass % or more, and a solution diluted with NMP in which graphene accounts for a weight fraction adjusted to 0.000013 relative to the entire diluted solution that has a weight fraction of 1 preferably has a weight-based absorptivity coefficient as calculated by Equation (4) given below (hereinafter referred to simply as weight-based absorptivity coefficient) in the range of 25,000 cm$^{-1}$ or more and 200,000 cm$^{-1}$ or less at a wavelength of 270 nm.

$$\text{weight-based absorptivity coefficient (cm}^{-1}\text{)}=\text{absorbance}/\{0.000013\times\text{cell's optical path length (cm)}\}. \quad (4)$$

The absorbance per unit weight of graphene varies depending on the degree of exfoliation of the graphene, and it is highest for monolayer graphene and decreases with an increasing number of layers and an increasing degree of agglomeration, suggesting that a preferable range exists.

If the weight-based absorptivity coefficient is in the range of 25,000 cm$^{-1}$ or more and 200,000 cm$^{-1}$ or less, a moderate surface area and dispersibility will be realized simultaneously and good conductive paths will be formed and maintained easily in resin, electrode paste, or the like. The weight-based absorptivity coefficient is more preferably 40,000 cm$^{-1}$ or more and 150,000 cm$^{-1}$ or less, and still more preferably 45,000 cm$^{-1}$ or more and 100,000 cm$^{-1}$ or less.

For a diluted solution prepared as described above, furthermore, the ratio between the absorbance at a wavelength of 270 nm and that at 600 nm as calculated by Equation (5) given below (hereinafter simply referred to as absorbance ratio) is preferably 1.70 or more and 4.00 or less, more preferably 1.80 or more and 3.00 or less, and still more preferably 1.90 or more and 2.50 or less:

$$\text{absorbance ratio}=\text{absorbance (270 nm)}/\text{absorbance (600 nm)}. \quad (5)$$

The absorbance of light contains an absorption component and a scattering component, and the scattering component varies with the surface state of the graphene. The contribution of the scattering component to the absorbance is small at a wavelength of 270 nm, but the absorption component is smaller at a wavelength of 600 nm, leading to an increased contribution of the scattering component to the absorbance. If the graphene contained has a high degree of agglomeration, the absorbance ratio will be less than 1.70, possibly making it difficult to form and maintain good conductive paths in resin or electrode paste. As the graphene is granulated excessively, the absorbance ratio will become larger than 4.00, possibly leading to increased tendency to agglomerate in resin or electrode paste.

Here, the absorbance of a diluted solution prepared from a graphene dispersion liquid can be measured using an ultraviolet and visible spectrophotometer. The absorbance values of graphene to be used in Equations (4) and (5) given above can be obtained by subtracting the absorbance of the solvent used in the diluted solution from the absorbance of the diluted solution prepared from the graphene dispersion liquid. For the graphene dispersion liquid according to the present invention, it is preferable for the value of (W2−W1)/G to be 0.005 or more and 0.05 or less, where W1 (mass %) is the water content measured at 130° C. by the Karl Fischer's method; W2 (mass %) is the water content measured at 250° C. by the Karl Fischer's method; and G (mass %) is the solid content of the graphene.

Here, W1 shows the percentage of the sum of roughly calculated amounts of the free water contained in the organic solvent in the graphene dispersion liquid and the adsorbed water that is adsorbed on the graphene but can be removed easily. On the other hand, W2 denotes the percentage of the combined amount of the aforementioned sum of free water and adsorbed water and the bound water that is strongly bonded to the graphene surface and cannot be removed at a temperature as high as 130° C. Thus, (W2−W1) gives a roughly calculated content of the bound water that is strongly bonded to the graphene.

Such bound water is bonded strongly via the hydroxyl group, carboxyl group, epoxy group, carbonyl group, etc., contained in the graphene. The existence of this bound water allows the graphene and the organic solvent to interact easily with each other, thereby enabling stable dispersion. It is desired therefore that the weight ratio of the bound water to the graphene be controlled in an appropriate range.

The existence of bound water also serves to improve the ion conductivity of the graphene. Graphene has a thin, plate-like structure and in addition, π-π interaction occurs between graphene layers, serving to promote the stacking of the layers. It is difficult for ions to move in graphene if these graphene layers are stacked without interlaminar gaps. Compared to this, if graphene contains a moderate amount of bound water, interlaminar gaps are formed easily between stacked graphene layers, often leading to an increased number of ion conducting paths and an improved ion conductivity.

If the value of (W2−W1)/G is controlled in the range of 0.005 or more and 0.05 or less, it serves to achieve good dispersion in the organic solvent to ensure both the formation of good conductive paths and high ion conductivity in the electrodes in a lithium ion battery. It is preferable for the value of (W2−W1)/G to be 0.008 or more, more preferably 0.01 or more. It is also preferable for the value of (W2−W1)/G to be 0.03 or less, more preferably 0.02 or less.

W1 and W2 are measured by the Karl Fischer's method. More specifically, they are measured by the water evaporation—coulometric titration procedure specified in JIS K 0113 (2005) 8.3. There are no specific limitations on the measuring apparatus to be used, and any appropriate commercial water fraction measuring apparatus may be adopted. Examples of such a water fraction measuring apparatus include AQ-2200 Karl Fischer Aquameter manufactured by Hiranuma Sangyo Co., Ltd.

For the graphene contained in the graphene dispersion liquid according to the present invention, the specific surface area as measured by the BET measuring method (hereinafter occasionally referred to simply as specific surface area) is preferably 80 m$^2$/g or more and 250 m$^2$/g or less. The specific surface area of graphene reflects the thickness of the graphene and the degree of exfoliation of the graphene. Specifically, the graphene becomes thinner and the degree of exfoliation becomes higher as it increases. The specific surface area of the graphene is preferably 100 m$^2$/g or more, more preferably 130 m$^2$/g or more. Similarly, it is preferably 200 m$^2$/g or less and more preferably 180 m$^2$/g or less. For the BET measuring method, a graphene dispersion liquid is predried by a vacuum dryer, freeze-drier, or the like, and the resulting dried specimen is examined according to the procedure specified in JIS Z 8830 (2013). The quantity of adsorbed gas is measured by the carrier gas method and the adsorption data are analyzed by the one point method.

The quotient of the value of (W2−W1)/G of the graphene dispersion liquid according to the present invention divided by the specific surface area of the graphene measured by the BET measuring method is preferably 0.000025 g/m$^2$ or more and 0.00025 g/m$^2$ or less, more preferably 0.000035 g/m$^2$ or more and 0.00015 g/m$^2$ or less, and still more preferably 0.000050 g/m$^2$ or more and 0.00010 g/m$^2$ or less.

<Organic Solvent>

There are no specific limitations on the organic solvent to be used in the graphene dispersion liquid according to the present invention, but the use of a solvent with a high polarity is preferable. The solvent with a high polarity is preferably an organic solvent having a dipole moment of 3.0 Debyes or more. Examples of such organic solvents include NMP, γ-butyrolactone, dimethyl acetamide, dimethyl formamide, dimethyl sulfoxide, acetonitrile, and mixtures thereof. Furthermore, since highly volatile solvents are difficult to handle in a stable way, it is preferable to adopt a solvent with a high boiling point. It is preferable for the organic solvent to have a boiling point of 150° C. or more, preferably 180° C. or more. NMP is particularly preferred as a solvent having both a high polarity and a high boiling point. The organic solvent preferably has an NMP content of 50 mass % or more.

<Production Method for the Graphene Dispersion Liquid>

The graphene dispersion liquid according to the present invention, which includes graphene dispersed in an organic solvent, can be produced by, for example, the following production method:

a reduction step for reducing graphene oxide dispersed in a water-containing dispersion medium;

a fine fragmentation step for finely fragmenting the graphene oxide or graphene contained in the intermediate dispersion liquid before or after the reduction step or in the middle of the reduction step;

an organic solvent mixing step for mixing the intermediate dispersion liquid resulting from the reduction step and the fine fragmentation step with an organic solvent;

a strong stirring step for stirring the intermediate dispersion liquid containing an organic solvent at a shear rate of 5,000 per second to 50,000 per second; and a water removal step for removing at least part of the water from the intermediate dispersion liquid by a combination of the addition of a organic solvent and suction filtration or by distillation.

Once the dispersion liquid is dried, the graphene will undergo strong interlaminar agglomeration. If both solvent substitution and shear application for exfoliation can be performed without drying the graphene, therefore, it will serve very effectively for good dispersion of graphene in the organic solvent. Thus, it is preferable to carry out the reduction step and all subsequent steps (or all steps including the fragmentation step and/or undermentioned surface treatment step if such steps precede the reduction step) in a state where graphene is dispersed in a dispersion medium and prevented at all times from coming into a powder state. If a fine fragmentation step is carried out before the solvent substitution in the organic solvent mixing step or the exfoliation by shear application in the strong stirring step, it will serve to allow the graphene to have an appropriate size S in the planar direction.

[Preparation Method for Graphene Oxide]

There are no specific limitations on the method to be used for the preparation of graphene oxide, and a generally known method such as the Hummers method may be adopted. A commercially available graphene oxide product may also be used. Described below is an example procedure that uses the Hummers method to prepare graphene oxide.

First, graphite (graphite powder) and sodium nitrate are added to concentrated sulfuric acid, followed by adding potassium permanganate little by little while stirring to prevent the temperature from rising. Continue stirring to maintain the reaction at 25° C. to 50° C. for 0.2 to 5 hours. Subsequently, add ion-exchanged water for dilution to prepare a suspension liquid and maintain the reaction at 80° C. to 100° C. for 5 to 50 minutes. Finally, add hydrogen peroxide and deionized water and maintain the reaction for 1 to 30 minutes to provide a graphene oxide dispersion liquid. Filtrate and wash the resulting graphene oxide dispersion liquid to provide gel of graphene oxide. This graphene oxide gel may be diluted for use in mixing treatment with a surface treatment agent or reduction treatment.

The graphite material used for producing graphene oxide may be either artificial graphite or natural graphite, of which, however, natural graphite is preferred. The grain size of the graphite raw material is preferably 20,000 mesh or less, more preferably 5,000 mesh or less.

Typical quantities of the reactants per 10 g of graphite are as follows: concentrated sulfuric acid 150 to 300 ml, sodium nitrate 2 to 8 g, potassium permanganate 10 to 40 g, and hydrogen peroxide 40 to 80 g. When adding sodium nitrate and potassium permanganate, use an ice bath to control the temperature. When adding hydrogen peroxide and deionized water, the weight of deionized water should be 10 to 20 times that of hydrogen peroxide. The concentrated sulfuric acid to be used preferably has a concentration by mass of 70% or more, more preferably 97% or more.

Graphene oxide has high dispersibility, but the substance itself has insulating properties and cannot serve as conductive additive or the like. If the graphene oxide material has an excessively high degree of oxidation, the graphene powder obtained by its reduction will likely be low in electric conductivity, and therefore, the proportion of carbon atoms to oxygen atoms in the graphene oxide material, determined by X-ray photoelectron spectroscopy, is preferably 0.5 or more. The graphene oxide material should be dry and free of solvents when subjected to X-ray photoelectron spectroscopy.

If graphite should not be oxidized thoroughly, flaky graphene powder will not be obtained easily in the reduction step. Therefore, it is preferable for the graphene oxide material to give no detectable peaks attributable to graphite when examined by X-ray diffraction after drying.

The degree of oxidation of the graphene oxide material can be controlled by changing the quantity of the oxidizing agent used to oxidize graphite. More specifically, the degree of oxidation increases with increasing quantities of sodium nitrate and potassium permanganate relative to the quantity of graphite used in the oxidization reaction, whereas the degree of oxidation decreases with decreasing quantities thereof. There are no specific limitations on the weight ratio of sodium nitrate to graphite, but it is preferably 0.200 or more and 0.800 or less, more preferably 0.250 or more and 0.500 or less, and still more preferably 0.275 or more and 0.425 or less. There are no specific limitations on the weight ratio of potassium permanganate to graphite, but it is preferably 1.00 or more, more preferably 1.40 or more, and still more preferably 1.65 or more. On the other hand, it is preferably 4.00 or less, more preferably 3.00 or less, and still more preferably 2.55 or less.

[Reduction Step]

In the reduction step, graphene oxide dispersed in a water-containing dispersion medium is reduced to graphene.

The water-containing dispersion medium may be water alone or may contain a solvent other than water. Such a solvent other than water is preferably a polar solvent, and examples include ethanol, methanol, 1-propanol, 2-propanol, N-methylpyrolidone, dimethylformamide, dimethylacetamide, dimethylsulfoxide and γ-butyrolactone. There are no specific limitations on the water fraction in the water-containing dispersion medium, but the water fraction is preferably 50 mass % or more if an inorganic reduction agent is to be added.

If the surface treatment step described later is to be performed in a solvent, it is preferable that the fine fragmentation step be performed in an as obtained state after the surface treatment step and immediately followed by the reduction step, or the liquid is diluted with the same solvent as used in the surface treatment step before the reduction step.

For the reduction step, it is preferable to use a reduction agent to perform chemical reduction. There are no specific limitations on the reduction agent to be used to reduce graphene oxide, and various organic reduction agents and inorganic reduction agents are useful. Of them, inorganic reduction agents are preferable because of the easiness of washing after the reduction.

Useful organic reduction agents include aldehyde based reduction agents, hydrazine derivative reduction agents, and alcohol based reduction agents, of which alcohol based reduction agents are particularly preferred because they can perform relatively slow reduction. Useful alcohol based reduction agents include methanol, ethanol, propanol, isopropyl alcohol, butanol, benzyl alcohol, phenol, ethanol amine, ethylene glycol, propylene glycol, and diethylene glycol.

Useful inorganic reduction agents include sodium dithionite, potassium dithionite, phosphorous acid, sodium borohydride, and hydrazine, of which sodium dithionite and potassium dithionite are preferred because they can hold acidic groups relatively strongly during the reduction step, thereby serving to produce a graphene with high dispersibility in solvents.

[Washing Step]

After the reduction step, it is preferable to adopt a washing step designed for dilution with water and filtration in order to provide a gel-like dispersion liquid consisting mainly of graphene dispersed in water. In the present Description, any intermediate material, gel-like or not, that is not a finally completed graphene dispersion liquid according to the present invention, but forms before the completion of the production process and contains graphene or graphene oxide dispersed in a dispersion medium is referred to as an intermediate dispersion liquid for convenience's sake.

[Surface Treatment Step]

A surface treatment step designed for mixing an intermediate dispersion liquid with a surface treatment agent having an acidic group may be added, in some instances, before, after, or in the middle of the reduction step. Useful surface treatment agents are as given previously.

For proper mixing of graphene oxide and a surface treatment agent, it is preferable to perform the mixing in a state where both the graphene oxide and the surface treatment agent are dispersed in an aqueous solution. In this instance, it is preferable that both the graphene oxide and the surface treatment agent be completely dissolved, but part thereof may be left undissolved and dispersed in a solid state.

[Fine Fragmentation Step]

A fine fragmentation step is carried out before, after, or in the middle of the reduction step in order to finely fragment graphene oxide contained in the intermediate dispersion liquid before or after the reduction step or in the middle of the reduction step or the graphene after reduction. To obtain the graphene dispersion liquid according to the present invention, graphene oxide is preferably in a finely fragmented state when used in the reduction step and therefore, the fine fragmentation step is preferably performed before the reduction step or in the middle of the reduction step.

The addition of the fine fragmentation step serves to allow the graphene oxide or graphene to have an appropriate size S in the planar direction. There are no specific limitations on the method to be used for the fine fragmentation, and available methods include one in which a plurality of pieces, such as beads and balls, of a crushing medium are mixed with a dispersion liquid and caused to strike against each other in order to crush and disperse the graphene oxide or graphene, but a medium-free technique in which a large shear force is applied to the dispersion liquid without using a crushing media is preferred because the agglomeration of pieces of graphene oxide or graphene can be induced in the former technique. For example, specific techniques include one in which a pressure is applied to an intermediate dispersion liquid to cause it to collide against a single ceramic ball and one that uses a liquid-liquid shearing type wet jet mill in which streams of an intermediate dispersion liquid are caused to collide against each other to achieve dispersion. The application of ultrasonic waves to an intermediate dispersion liquid is also a medium-free dispersion technique that is preferred.

In the fine fragmentation step, graphene oxide and graphene tend to be fragmented more finely with an increasing treatment pressure and output used in the medium-free dispersion method, and they also tend to be fragmented more finely with an increasing treatment time. The preferred size S in the planar direction of graphene is as described previously. The size of graphene obtained after the reduction step can be controlled by selecting an appropriate type of fine fragmentation treatment, treatment condition, and treatment time for the fine fragmentation step. Preferable conditions of the fine fragmentation treatment to obtain graphene according to the present invention include a solid content of 0.01% to 2%, more preferably 0.05% to 1%, for the graphene oxide or graphene. If ultrasonic treatment is to be performed, the ultrasonic output is preferably 100 W or more and 3,000 W or less, and more preferably 200 W or more and 2,000 W or less. The treatment time is preferably 10 minutes or more and 10 hours or less, more preferably 20 minutes or more and 5 hours or less, and still more preferably 30 minutes or more and 3 hours or less.

[Organic Solvent Mixing Step]

In order to replace the water in the, intermediate dispersion liquid resulting from the reduction step and the fine fragmentation step with an organic solvent, an organic solvent mixing step is performed to mix the intermediate dispersion liquid and the organic solvent. In the organic solvent mixing step, the intermediate dispersion liquid resulting from the reduction step and the fine fragmentation step or, in some instances, the intermediate dispersion liquid resulting from the washing step and/or the surface treatment step, is mixed directly with an organic solvent. This means that once the reduction step is finished, the intermediate dispersion liquid is always in the state of a dispersion liquid until it is mixed with an organic solvent in the organic solvent mixing step, and any step, such as freeze-drying, designed to obtain powdery graphene by removing the dispersion medium from the intermediate dispersion liquid is not performed.

There are no specific limitations on the mixing ratio between the intermediate dispersion liquid and the organic solvent in the organic solvent mixing step, but handling will be difficult due to increased viscosity if the quantity of the organic solvent mixed is too small, whereas the efficiency of treatment will be low due to a decreased quantity of graphene per unit treatment volume if the quantity of the organic solvent mixed is too large. With the aim of increasing the treatment efficiency while allowing the dispersion liquid to maintain a low viscosity to ensure easy handling, it is preferable to add 10 to 3,000 parts by mass, more preferably 20 to 2,000 parts by mass, and still more preferably 50 to 1,500 parts by mass, of the organic solvent to 100 parts by mass of the intermediate dispersion liquid resulting from the reduction step.

[Strong Stirring Step]

After the organic solvent mixing step, the intermediate dispersion liquid is subjected to a step designed to stir it at a shear rate of 5,000 per second to 50,000 per second (strong stirring step). The strong stirring step serves to exfoliate the graphene to break down the stacking of graphene layers. It should be noted that in the present Description, any rotary blade type mixer that can apply a required shear force to an intermediate dispersion liquid is referred to as a high shear mixer.

For the strong stirring step, the shear rate is 5,000 per second to 50,000 per second. The shear rate is calculated by dividing the circumferential speed at the end of the maximum diameter of the rotary blade of the mixer by the distance from the wall surface to the tip of the rotary blade of the mixer (the tip of the blade that defines the maximum diameter). The circumferential speed of the rotary blade of a mixer is calculated as circumference ×rotating speed. If the shear rate is too small, the graphene will not undergo exfoliation easily, leading to a low degree of graphene exfoliation. If the shear rate is too large, on the other hand, the degree of graphene exfoliation will become too high, causing a decrease in dispersibility. The shear rate is preferably 10,000 or more per second and more preferably 15,000 or more per second. Similarly, it is preferably 45,000 or less per second and more preferably 40,000 or less per second. Furthermore, the treatment in the strong stirring step preferably lasts for 15 seconds to 300 seconds, more preferably for 20 seconds to 120 seconds, and still more preferably for 30 seconds to 80 seconds.

The high shear mixer used in the strong stirring step should be of a thin film rotation type, rotor/stator type, etc.; in which the distance between the rotating blade and the wall surface is short, specifically 10 mm or less, and it is preferably a medium-free mixer. Examples of such a mixer include Filmics (registered trademark) Model 30-30 (manufactured by Primix), Clearmix (registered trademark) CLM-0.8S (manufactured by M Technique. Co. Ltd.), and Super Shear Mixer SDRT 0.35-0.75 (manufactured by Satake Chemical Equipment Mfg., Ltd.).

[Water Removal Step]

The water removal step for the present invention is designed for removing at least part of the water of the intermediate dispersion liquid by a combination of the addition of an organic solvent and suction filtration or by distillation. The use of such a solvent removal means as compression filtration or centrifugal separation that applies a large force to graphene contained in the dispersion liquid tends to cause layered agglomeration of the graphene. Such a water removal step is preferably performed at a stage after the end of the strong stirring step, but if the organic solvent mixing step precedes, it may be performed before the strong stirring step.

To carry out the combination of the addition of an organic solvent and suction filtration during the water removal step, it is preferable to add an organic solvent to the intermediate dispersion liquid and stir it, followed by performing suction filtration under reduced pressure. Specifically, such suction filtration under reduced pressure can be carried out by filtering the liquid while performing suction using a Buchner funnel, Hirsch funnel, or the like. By repeating the organic solvent mixing step and suction filtration several times, free water and adsorbed water can be removed from the intermediate dispersion liquid. Useful organic solvents are as given previously.

If the organic solvent has a boiling point higher than that of water, water is preferably removed by distillation. There are no specific limitations on the pressure to be used for the distillation, but vacuum distillation is preferred because water can be removed efficiently.

[Heating Step]

In addition, a step for heating the intermediate dispersion liquid at 70° C. or more (heating step) is preferably carried out at a stage after the reduction step. The heating step serves for reduction of the bound water in the intermediate dispersion liquid. The heating step may be carried out by, for example, feeding the intermediate dispersion liquid into a heating and stirring apparatus and stirring it while heating in such a manner that it will not be dried. The heating temperature is more preferably 80° C. or more. At very high temperatures, however, part of the functional groups such as the hydroxyl group can be desorbed from graphene and accordingly, the heating temperature is preferably 150° C. or less and more preferably 120° C. or less. From the viewpoint of efficient water removal, it is particularly preferable for the heating step and the strong stirring step to be performed simultaneously.

In the case where distillation is adopted for the water removal step, its simultaneous implementation with the heating step can be achieved by performing distillation while heating at 70° C. or more, and this is preferable because free water, adsorbed water, and bound water can be removed simultaneously in one stage. In this case, the method of performing vacuum distillation while heating at 70° C. or more is particularly preferable. More specifically, a good means is the use of a heating and stirring apparatus equipped with a rotary evaporator or a vacuum line. There are no specific limitations on the pressure to be used for the distillation, but vacuum distillation is preferred because water can be removed efficiently.

<Production Method for Graphene-Electrode Active Material Composite Particles>

There are no specific limitations on the uses of the graphene dispersion liquid according to the present invention, but it works effectively when used, for example, in combining graphene with electrode active material particles, such as electrode active material particles for lithium ion batteries, to produce a composite. The expression "to produce a composite" used above means maintaining a state in which graphene is in contact with the surface of electrode active material particles. Preferred embodiments of such composite production include combining graphene and electrode active material particles together into integrated particles or adhering graphene on the surfaces of electrode active material particles.

When used for producing graphene-electrode active material composite particles, the active material to be adopted may be either a positive electrode active material or a negative electrode active material. This means that the graphene dispersion liquid according to the present invention can serve for both positive electrode production and negative electrode production. When used as electrode active material particles for lithium ion batteries, there are no specific limitations on positive electrode active materials, and useful ones include composite oxides of lithium and transition metals such as lithium cobaltate ($LiCoO_2$), lithium nickelate ($LiNiO_2$), spinel type lithium manganate ($LiMn_2O_4$), ternary compounds with cobalt partially substituted by nickel and manganese ($LiMn_xNi_yCo_{1-x-y}O_2$), and spinel type lithium manganate ($LiMn_2O_4$); olivine based (phosphoric acid based) active materials such as iron lithium phosphate ($LiFePO_4$); metal oxides such as $V_2O_5$; and metal compounds such as $TiS_2$, $MoS_2$, and $NbSe_2$. There are no specific limitations on negative electrode active materials, and useful ones include carbon based materials such as natural graphite, artificial graphite, and hard carbon; silicon compounds containing SiO, SIC, SiOC, etc., as basic constituents; lithium titanate ($Li_4Ti_5O_{12}$), and metal oxides such as manganese oxide (MnO) and cobalt oxide (CoO) that can undergo conversion reaction with lithium ions.

Graphene-electrode active material composite particles can be produced by mixing the graphene dispersion liquid according to the present invention and active material particles and drying the mixture by an appropriate technique such as spray drying and freeze-drying. Useful methods for mixing a graphene dispersion liquid and active material particles include the use of such a tool as three roll mill, wet bead mill, wet planetary ball mill, homogenizer, planetary mixer, and twin screw kneading machine.

<Production Method for Electrode Paste>

The graphene dispersion liquid according to the present invention also serves to produce electrode paste for lithium ion battery electrodes. Specifically, such electrode paste can be produced by adding the graphene dispersion liquid according to the present invention, used as conductive additive, and, if required, an appropriate quantity of solvent to an electrode active material and a binder, followed by mixing them.

Electrode active materials suitable to produce electrode paste for lithium ion batteries include those described previously.

There are no specific limitations on the binder to be used, and useful examples include fluorine based polymers such as polyvinylidene fluoride (PVDF) and polytetrafluoroethylene (PTFE); rubbers such as styrene butadiene rubber (SBR) and natural rubber; polysaccharides such as carboxymethyl cellulose; and others such as polyimide precursor and/or polyimide resin, polyamide-imide resin, polyamide resin, polyacrylic acid, sodium polyacrylate, acrylic resin, and polyacrylonitrile. They may be used as mixtures of two or more thereof.

The conductive additive to be used may be the graphene alone contained in the graphene dispersion liquid according to the present invention, and another conductive additive may be used in addition. There are no specific limitations on the additional conductive additive, and useful examples include carbon black materials such as furnace black, Ketjen Black (registered trademark), and acetylene black, graphite materials such as natural graphite (scale-like graphite etc.) and artificial graphite, conductive fibers such as carbon fiber and metal fiber, and powdery metals such as copper, nickel, aluminum, and silver. Useful examples of the solvent to be used additionally include NMP, γ-butyrolactone, water, and dimethyl acetamide.

EXAMPLES

Measurement Example 1

Median Diameter (D) of Graphene

A specimen of a graphene dispersion liquid diluted with NMP to 0.5 mass % was examined by the laser diffraction/scattering particle size distribution measuring method using a particle size distribution measuring apparatus manufactured by Horiba (Laser Scattering Particle Size Distribution Analyzer LA-920) to determine its particle size distribution, and the particle diameter corresponding to the median was adopted as median diameter (D, μm). The same solvent as contained in the graphene dispersion liquid was used in the apparatus and measurement was performed without applying ultrasonic waves as pre-treatment. The refractive index of graphene was assumed to be 1.43.

Measurement Examle 2

Size in the Planar Direction of Graphene (S)

A specimen of the graphene dispersion liquid was diluted with an NMP to 0.002 mass %, dropped on a glass substrate, and dried to allow it to adhere to the substrate. The graphene specimen on the substrate was observed by a VK-X250 laser microscope manufactured by Keyence Corporation. The largest diameter (μm) and the smallest diameter (μm) across each graphene fragment was measured and the arithmetic mean was caluculated. A total of 50 randomly selected graphene granules were examined, and the average was adopted as the size in the planar direction of the graphene (S, μm).

Measurement Example 3

Thickness of (T) of Graphene

A specimen of the graphene dispersion liquid was diluted with an NMP to 0.002 mass %, dropped on a glass substrate, and dried to allow it to adhere to the substrate. The graphene specimen on the substrate was observed by a VK-X250 laser microscope manufactured by Keyence Corporation to determine the thickness of each graphene fragment. For a fragment having a significant thickness variation, the average over the surface area was determined. A total of 50 randomly graphene selected fragments are examined, and the average thickness T was adopted.

Measurement Example 4

Solid Content (G)

A specimen of the graphene dispersion liquid was deposited on a glass substrate with a known weight and the total weight was measured, followed by heating for 1.5 hours on a hot plate with a temperature adjusted to 120° C. to volatilize the solvent. The solid content G (mass %) of the graphene dispersion liquid was determined from the weight of the volatilized solvent calculated from the difference between the weight of the graphene dispersion liquid specimen before heating and that after heating. This procedure was repeated three times and the average was adopted.

Measurement Example 5

X-Ray Photoelectron Measuring Method

The X-ray photoelectron measuring method was carried out using Quantera SXM manufactured by PHI. The excited X-ray used was monochromatic Al Kα1,2 beam (1486.6 eV), and the X-ray beam diameter and photoelectron take-off angle were 200 μm and 45°, respectively. The C1s main peak based on carbon atoms was assumed to be at 284.3 eV and the peak near 533 eV was attributed to the O1s peak based on oxygen atoms. The O/C ratio was determined from the area ratios of the peaks. To prepare samples to be used for the measurement, an aqueous dispersion of reduced graphene obtained in Examples given below was filtered through a suction filtration apparatus and a washing step consisting of dilution with ion-exchanged water to 0.5 mass % and suction filtration was repeated five times, followed by freeze-drying to provide a graphene powder.

Measurement Example 6

Evaluation of Battery Performance

A specimen of the graphene dispersion liquid prepared in each Example or Comparative example having a graphene solid content corresponding to 1.5 parts by mass was combined with 100 parts by mass of $LiNi_{0.5}Co_{0.2}Mn_{0.3}O_2$ used as electrode active material, 1.5 parts by mass of acetylene black as additional conductive additive, 5 parts by mass of polyvinylidene fluoride as binder, and 100 parts by mass of NMP as solvent, and they were mixed in a planetary mixer to prepare an electrode paste. This electrode paste was spread over a piece of aluminum foil (with a thickness of 18 μm) using a doctor blade (300 μm) and dried at 80° C. for 15 minutes, followed by vacuum drying to prepare an electrode plate.

A disk with a diameter of 15.9 mm was cut out from the electrode plate prepared above to use as positive electrode while a disk with a diameter of 16.1 mm to use as negative electrode was produced from a counter electrode mixture of 98 parts by mass of graphite, 1 part by mass of carboxymethyl cellulose sodium, and 1 part by mass of an aqueous SBR dispersion. A disk with a diameter 17 mm cut out from Celgard #2400 (manufactured by Celgard) was used as separator while a solvent of ethylene carbonate and diethyl carbonate mixed at a ratio of 7:3 containing 1M $LiPF_6$ was used as electrolyte to prepare a 2042 type coin battery. A charging and discharging measurement run was repeated three times under the conditions of an upper limit voltage of 4.2 V, a lower limit voltage 3.0 V, and a rate of 0.1 C, 1 C, and 5 C in this order, and subsequently it was repeated 491 times at 1 C, thus carrying out a total of 500 charging and discharging runs. The discharge capacity was determined for the third of the runs performed at 1 C, the third of the runs performed at 5 C, and the 491st of the subsequent runs performed at 1 C.

Measurement Example 7

Absorbance

The absorbance of each sample was measured using a U-3010 spectrophotometer (manufactured by Hitachi High- Tech Science Corporation). A quartz cell with an optical path length of 10 mm was used. NMP was added to the graphene dispersion liquid or graphene powder prepared in each Example described below to adjust the graphene weight fraction to 0.000013 and treated for 10 minutes in an ultrasonic cleaning machine (ASU-6M, manufactured by As One Corporation) with an output of 130 W and an oscillating frequency of 40 kHz (output setting "High"). The resulting diluted solution was subjected to measurement based on baseline measurement that was performed in advance at the same proportion of the mixed solvent as in the diluted solution. The weight-based absorptivity coefficient, which is defined as Equation (4) given below, was calculated from the absorbance measured at 270 nm.

weight-based absorptivity coefficient $(cm^{-1})$=absorbance/{0.000013×cell's optical path length (cm)}. (4)

Then, the absorbance ratio, which is defined as the equation given below, was calculated.

absorbance ratio=absorbance (270 nm)/absorbance (600 nm). (5)

Measurement Example 8

Evaluation of Specific Surgace Area

The specific surface area of graphene was measured by HM Model-1210 (manufactured by Macsorb). Measurements were made according to JIS Z8830 (2013). Specifically, the quantity of adsorbed gas was measured by the carrier gas method and the adsorption data were analyzed by the one point method. Deaeration was performed at 100° C. for 180 minutes. To prepare samples to be used for the measurement, an aqueous dispersion of reduced graphene obtained in Examples given below was filtered through a suction filtration apparatus and a washing step consisting of dilution with water to 0.5 mass % and suction filtration was repeated five times, followed by freeze-drying to provide a graphene powder.

Measurement Example 9

Measurement of Water Content

A specimen of the graphene dispersion liquid was examined by AQ-2200 Karl Fischer Aquameter and a EV-2010 water vaporizing apparatus (manufactured by Hiranuma Sangyo Co., Ltd.) and its water content was determined by the water vaporization-coulometric titration method specified in JIS K 0113 (2005) 8.3. A specimen of the graphene dispersion liquid was fed to the water vaporizing apparatus and heated at 130° C. or 250° C., where measurements were taken to provide the water content values of W1 (mass %) and W2 (mass %).

Synthesis Example 1

Preparation method for graphene oxide: Natural graphite powder of 1,500 mesh (manufactured by Shanghai Yifan Graphite Co., Ltd.) was used as starting material, and 220 ml of 98% concentrated sulfuric acid, 5 g of sodium nitrate, and 30 g of potassium permanganate were added to 10 g of natural graphite powder in an ice bath, followed by mechanical stirring for 1 hour while maintaining the liquid mixture at a temperature of 20° C. or less. This liquid mixture was taken out of the ice bath and stirred in a 35° C. water bath for 4 hours to ensure thorough reaction, followed by pouring 500 ml of ion-exchanged water and continuing reaction of the resulting suspension liquid at 90° C. for additional 15 minutes. Finally, 600 ml of ion-exchanged water and 50 ml of hydrogen peroxide were added and reaction was continued for 5 minutes to provide a graphene oxide dispersion liquid. After filtering it while it is hot, the metal ion was washed with a dilute hydrochloric acid solution and the acid was washed with ion-exchanged water. Washing was performed repeatedly until reaching a pH of 7 to provide a graphene oxide gel. For the resulting graphene oxide gel, the element ratio of the oxygen atom to the carbon atom, which was determined by X-ray photoelectron spectroscopy, was 0.53.

Example 1

The graphene oxide gel prepared in Synthesis example 1 was diluted with ion-exchanged water to a concentration of 30 mg/ml and treated in an ultrasonic washing machine for 30 minutes to provide a uniform graphene oxide dispersion liquid.

A 20 ml portion of the resulting graphene oxide dispersion liquid was mixed with 0.3 g of dopamine hydrochloride used as surface treatment agent and treated in Homodisper Model 2.5 (manufactured by Primix) at a rotating speed of 3,000 rpm for 60 minutes (surface treatment step). The graphene oxide dispersion liquid treated above was subjected to ultrasonic treatment for 30 minutes using an ultrasonic apparatus (UP400S, manufactured by Hielscher) with an output of 300 W (fine fragmentation step). After the treatment, the graphene oxide dispersion liquid was diluted with ion-exchanged water to 5 mg/ml, and 0.3 g of sodium dithionite was added to 20 ml of the diluted dispersion liquid, followed by continuing reduction reaction for 1 hour while groups maintaining the temperature at 40° C. (reduction step). Subsequently, it was filtered through a reduced-pressure suction filtration machine, further diluted with ion-exchanged water to 0.5 mass %, and subjected to suction filtration. This washing procedure was repeated 5 times to ensure thorough washing (washing step). The washed liquid was diluted with NMP having a dipole moment of 4.1 Debyes to 0.5 mass % (organic solvent mixing step) and treated by Filmics (registered trademark) Model 30-30 (manufactured by Primix) at a circumferential speed of 40 m/s for 60 seconds (strong stirring step). In this instance, the distance between the rotary blade and the wall surface was 2 mm (0.002 m). The shear rate, calculated as (circumferential speed) / (distance to wall surface), is 20,000 per second. The resulting intermediate dispersion liquid was filtered through a reduced-pressure suction filtration apparatus, then diluted with NMP to a concentration of 0.5 mass %, and treated in Homodisper Model 2.5 (manufactured by Primix) at a rotating speed of 3,000 rpm for 30 minutes. This suction filtration procedure was repeated twice (water removal step) to provide a graphene dispersion liquid in which graphene was dispersed in NMP.

Example 1-2

Except for performing ultrasonic treatment for 10 minutes in the fine fragmentation step and performing Filmics treatment at a circumferential speed of 20 m/s (shear rate 10,000 per second) for 20 seconds in the strong stirring step, the same procedure as in Example 1 was carried out to provide a graphene dispersion liquid.

Example 1-3

Except for distilling the graphene dispersion liquid at 90° C. for 2 hours before the last suction filtration performed in Example 1, the same procedure as in Example 1 was carried out to provide a graphene dispersion liquid.

Example 2

Except for performing ultrasonic treatment for 20 minutes in the fine fragmentation step, the same procedure as in Example 1 was carried out to provide a graphene dispersion liquid.

Example 3

Except for performing Filmics treatment at a circumferential speed of 50 m/s (shear rate: 25,000 per second) for 120 seconds in the strong stirring step, the same procedure as in Example 1 was carried out to produce a graphene dispersion liquid.

Example 4

A graphene dispersion liquid prepared by the same procedure as in Example 1 was left in a vacuum for 10 minutes to remove part of the solvent so as to adjust the solid content to 9.8 mass %.

Example 5

Except for adding 0.6 g of the surface treatment agent, the same procedure as in Example 1 was carried out to provide a graphene dispersion liquid.

Example 6

Except for not adding a surface treatment agent, the same procedure as in Example 1 was carried out to produce a graphene dispersion liquid.

Comparative Example 1

Except for not performing the fine fragmentation step, the same procedure as in Example 1 was carried out to produce a graphene dispersion liquid.

Comparative Example 2

The Filmics treatment performed in Example 1 was replaced with treatment by Homodisper Model 2.5 (manufactured by Primix), which is lower in shear force than Filmics, performed at a rotating speed of 3,000 rpm for 30 minutes. In this instance, Homodisper had a rotary blade with a diameter of 30 mm and accordingly a calculated circumferential speed of 4.7 m/s. The container used for stirring had an inside diameter of 50 mm and the distance between the wall surface and the rotary blade was 10 mm. The shear rate is calculated at 470 per second. Except for this, the same procedure as in Example 1 was carried out to produce a graphene dispersion liquid.

Comparative Example 3

Except for performing Filmics treatment at a circumferential speed of 5 m/s (shear rate: 2,500 per second) in the strong stirring step in Example 1, the same procedure as in Example 1 was carried out to produce a graphene dispersion liquid.

For the graphene dispersion liquids prepared in Examples and Comparative examples, Table 1 shows the median diameter D, size in the planar direction of graphene S, D/S, thickness T, S/T, solid content G, O/C ratio of graphene, and results of battery performance evaluation of a lithium ion battery produced from the graphene dispersion liquid. For Examples 1, 1-2, and 1-3, furthermore, Table 2 gives measurement results of the absorbance, weight-based absorptivity coefficient, (W2−W1)/G, specific surface area, and (W2−W1)/(G×specific surface area).

TABLE 1

| | Production method | | | Physical properties of graphene dispersion liquid | | | |
|---|---|---|---|---|---|---|---|
| | surface treatment | fine fragmentation (UP400S) | stirring | median diameter [μm] D | size in planar direction [μm] S | D/S | thickness [μm] T |
| Example 1 | dopamine hydrochloride 0.3 g | 300 W 30 minutes | Filmics shear rate 20,000/s treatment time 60 s | 5.2 | 3.7 | 1.4 | 0.016 |
| Example 2 | dopamine hydrochloride 0.3 g | 300 W 20 minutes | Filmics shear rate 20,000/s treatment time 60 s | 9.7 | 3.6 | 2.7 | 0.015 |
| Example 3 | dopamine hydrochloride 0.3 g | 300 W 30 minutes | Filmics shear rate 25,000/s treatment time 120 s | 2.1 | 1.4 | 1.5 | 0.010 |
| Example 4 | dopamine hydrochloride 0.3 g | 300 W 30 minutes | Filmics shear rate 20,000/s treatment time 60 s | 4.9 | 3.4 | 1.5 | 0.015 |
| Example 5 | dopamine hydrochloride 0.6 g | 300 W 30 minutes | Filmics shear rate 20,000/s treatment time 60 s | 5.2 | 3.7 | 1.4 | 0.015 |
| Example 6 | — | 300 W 30 minutes | Filmics shear rate 20,000/s treatment time 60 s | 13 | 9.5 | 1.4 | 0.021 |

TABLE 1-continued

| | | | | | | | |
|---|---|---|---|---|---|---|---|
| Comparative example 1 | dopamine hydrochloride 0.3 g | — | Filmics shear rate 20,000/s treatment time 60 s | 25.2 | 22.3 | 1.1 | 0.553 |
| Comparative example 2 | dopamine hydrochloride 0.3 g | 300 W 30 minutes | Homodisper shear rate 470/s 3,000 rpm 30 min | 24.1 | 5.3 | 4.5 | 0.235 |
| Comparative example 3 | dopamine hydrochloride 0.3 g | 300 W 30 minutes | Filmics shear rate 2,500/s treatment time 60 s | 23.2 | 4.9 | 4.7 | 0.208 |

| | Physical properties of graphene dispersion liquid | | | Battery performance evaluation | | |
|---|---|---|---|---|---|---|
| | S/T | O/C ratio of graphene | solid content G [mass %] | discharge capacity 1 C [mAh/g] | discharge capacity 5 C [mAh/g] | discharge capacity 1 C (500 cycle) [mAh/g] |
| Example 1 | 228 | 0.15 | 5.2 | 140 | 85 | 120 |
| Example 2 | 237 | 0.15 | 5.2 | 139 | 85 | 119 |
| Example 3 | 140 | 0.15 | 5.3 | 139 | 85 | 118 |
| Example 4 | 223 | 0.14 | 9.8 | 125 | 65 | 90 |
| Example 5 | 243 | 0.35 | 4.9 | 118 | 63 | 76 |
| Example 6 | 452 | 0.14 | 5.3 | 122 | 70 | 93 |
| Comparative example 1 | 40 | 0.15 | 5.1 | 19 | 8 | 17 |
| Comparative example 2 | 23 | 0.15 | 4.9 | 16 | 5 | 15 |
| Comparative example 3 | 24 | 0.14 | 5.1 | 17 | 6 | 15 |

TABLE 2

| | Production method | | | Physical properties of graphene dispersion liquid | | | | |
|---|---|---|---|---|---|---|---|---|
| | fine fragmentation (UP400S) | stirring | water removal | median diameter [μm] D | size in planar direction [μm] S | D/S | thickness [μm] T | S/T |
| Example 1 | 300 W 30 minutes | Filmics shear rate 20,000/s treatment time 60 s | NMP dilution and reduced pressure aspiration filtration ×2 | 5.2 | 3.7 | 1.4 | 0.016 | 228 |
| Example 1-2 | 300 W 10 minutes | Filmics shear rate 10,000/s treatment time 20 s | NMP dilution and reduced pressure suction filtration ×2 | 19.8 | 10.2 | 2.0 | 0.025 | 406 |
| Example 1-3 | 300 W 30 minutes | Filmics shear rate 20,000/s treatment time 60/s | NMP dilution and reduced pressure suction filtration ×2 + 90° C. 2-hour distillation | 5.2 | 3.6 | 1.4 | 0.016 | 225 |

| | Physical properties of graphene dispersion liquid | | | | | |
|---|---|---|---|---|---|---|
| | O/C ratio of graphene | solid content G [mass %] | absorbance [270 nm] | weight-based absorptivity coefficient [cm$^{-1}$] | absorbance ratio 270 nm/600 nm | (W2 − W1)/G |
| Example 1 | 0.15 | 5.2 | 1.063 | 81800 | 2.06 | 0.032 |
| Example 1-2 | 0.15 | 5.1 | 0.537 | 41300 | 1.96 | 0.032 |
| Example 1-3 | 0.14 | 5.1 | 1.009 | 77600 | 1.96 | 0.024 |

The invention claimed is:

1. A graphene dispersion liquid comprising graphene dispersed in an organic solvent and meeting both Equations (1) and (2) given below wherein D is the median diameter (μm) of the graphene measured by the laser diffraction/scattering type particle size distribution measurement method and S is the average size (μm) in the planar direction of the graphene calculated from the arithmetic mean of the longest diameter and shortest diameter of the graphene observed by a laser microscope:

$$0.5 \ \mu m \leq S \leq 15 \ \mu m \quad (1)$$

$$1.0 \leq D/S \leq 3.0 \quad (2).$$

2. A graphene dispersion liquid as claimed in claim 1 meeting Equation (3) given below wherein T is the average thickness (μm) of the graphene observed by a laser microscope:

$$100 \leq S/T \leq 1,500 \quad (3).$$

3. A graphene dispersion liquid as claimed in claim 1, wherein the solid content (G) is 0.3 mass % or more and 40 mass % or less.

4. A graphene dispersion liquid as claimed in claim 1, wherein the graphene has an element ratio of oxygen to carbon (O/C ratio), which is determined by X-ray photoelectron spectroscopy, of 0.08 or more and 0.30 or less.

5. A graphene dispersion liquid as claimed in claim 1 further comprising a surface treatment agent having an acidic group.

6. A graphene dispersion liquid as claimed in claim 1, wherein the organic solvent has a dipole moment of 3.0 Debyes or more.

7. A production method for graphene-electrode active material composite particles comprising a step for mixing a graphene dispersion liquid as claimed in claim 1 and electrode active material particles and a subsequent step for drying.

8. A production method for electrode paste comprising a step for mixing an electrode active material, a binder, and a graphene dispersion liquid as claimed in claim 1.

9. A production method for a graphene dispersion liquid comprising:
a reduction step for reducing graphene oxide dispersed in a water-containing dispersion medium;
a fine fragmentation step for finely fragmenting the graphene oxide or graphene contained in an intermediate dispersion liquid before or after the reduction step or in the middle of the reduction step;
an organic solvent mixing step for mixing the intermediate dispersion liquid resulting from the reduction step and the fine fragmentation step with an organic solvent;
a strong stirring step for stirring the intermediate dispersion liquid containing an organic solvent at a shear rate of 5,000 per second to 50,000 per second; and
a water removal step for removing at least part of the water from the intermediate dispersion liquid by a combination of the addition of a organic solvent and suction filtration or by distillation.

10. A production method for a graphene dispersion liquid as claimed in claim 9, wherein the reduction step and all the subsequent steps are carried out in a state where graphene is dispersed in a dispersion medium and prevented at all times from coming into a powder state.

11. A production method for a graphene dispersion liquid as claimed in claim 9, wherein the fine fragmentation step is carried out by a medium-free technique.

12. A production method for a graphene dispersion liquid as claimed in claim 11, wherein ultrasonic treatment is adopted as the medium-free technique used in the fine fragmentation step.

13. A production method for a graphene dispersion liquid as claimed in claim 9 further comprising a heating treatment step for heating the intermediate dispersion liquid at 70° C. or more at a stage after the reduction step.

* * * * *